Patented Feb. 17, 1925.

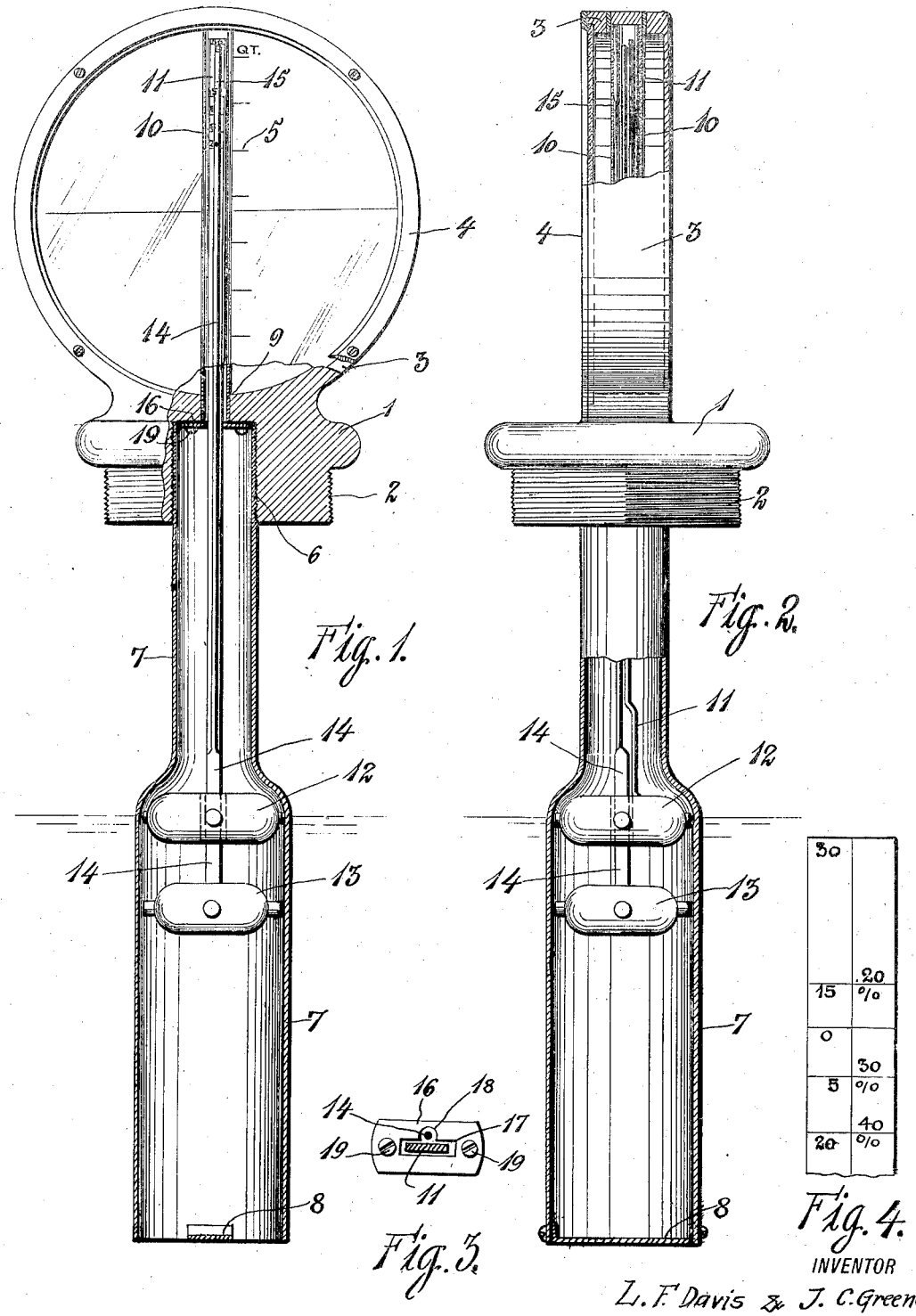

1,526,850

UNITED STATES PATENT OFFICE.

LEWIS F. DAVIS AND JESSE C. GREENE, OF AURORA, ILLINOIS.

DEVICE FOR INDICATING LIQUID LEVEL AND COMPOSITION.

Application filed November 21, 1921. Serial No. 516,639.

*To all whom it may concern:*

Be it known that we, LEWIS F. DAVIS and JESSE C. GREENE, both citizens of the United States, and residents of Aurora, in the county of Kane and State of Illinois, have invented a new and useful Improvement in Devices for Indicating Liquid Level and Composition, of which the following is a full, clear, and exact description.

Our invention relates to improvements in devices for indicating liquid level and composition, and it consists in the combinations, constructions and arrangements herein described and claimed.

The primary object of our invention is to provide a device which will indicate at a glance the temperature at which a cooling solution in an automobile radiator will freeze. This we accomplish by making use of a pair of floats so arranged that there will be a relative movement of the floats and hence a relative movement of the arms connected to them, the amount of movement depending upon the density of the liquid, as for instance, a mixture of alcohol and water.

A further object of our invention is to provide a device which will indicate the percentage of a liquid component in a solution, as for instance, the percentage of alcohol in water, where such solution is used in connection with automobile radiators, when it is desired to have a non-freezing solution.

A further object of our invention is to provide a device of the type described which can be readily attached to or removed from the radiator filler spout of any automobile, without in any way interfering with the normal operation of the radiator.

A further object of our invention is to provide a device of the type described, in which the fluctuations in the level of the cooling liquid of an automobile radiator is compensated for, so that the freezing temperature of the cooling liquid may be ascertained at any time.

Other objects and advantages will appear in the following specification, and the novel features of the invention will be particularly pointed out in the appended claims.

Our invention is illustrated in the accompanying drawings, forming part of this application, in which—

Figure 1 is a face view of the device, certain portions being shown in section,

Figure 2 is a side view of the device, certain portions being shown in section,

Figure 3 is a detail view of a guide member, and

Figure 4 is a modified form of scale.

In carrying out our invention, we provide a cap 1, having threads 2 arranged to fit the radiator filler spout (not shown). Integral with the cap 1 is a casing 3 having a glazed cover portion 4. The rear interior of this casing is provided with a scale 5 to indicate the amount of liquid in the radiator and is preferably graduated in quarts.

The cap 1 is provided with a central threaded bore 6 arranged to receive the reduced threaded end portion of a tube 7, whose bottom is open. A cross member 8 is provided at the bottom for a purpose hereinafter explained.

Disposed in an opening 9 in the cap 1 is a glass tube 10 which extends through the center of the casing 3. This glass tube is arranged to receive an arm 11, upon which is placed a scale reading preferably in degrees Fahrenheit, or it may be calibrated in degrees and percentages, as shown in Figure 4. The arm 11 is continued downwardly and is secured to an upper ring-shaped float 12. A second float 13 is provided below the float 12. To this second float is secured an arm 14, which has an enlarged lower portion arranged to pass through an opening in the float 12. The upper part of the arm 14 is reduced and its end forms a pointer 15 which extends upwardly in front of the scale on the arm 11.

From the foregoing description of the various parts of the device, the operation thereof may be readily understood. The lower float 13, as will be seen by the drawings, has a small diameter. The lower portion of the arm 14 to which the float 13 is attached, forms, together with the body portion of the float, a member similar to the bulb and stem of a hydrometer. This float is constructed so that it will sink in the liquid to a depth depending upon the density of the liquid. The upper portion of the arm 14 serves as a pointer to indicate on the scale on the arm 11 the temperature at which the cooling liquid will freeze, or the percentage of alcohol present in the water, where the cooling liquid consists of a mixture of alcohol and water.

The float 12 is designed to rest on the top of the liquid. It is true, of course, that it sinks to a certain extent, and that the variations in the density of the liquid will cause a slight differenece in the depth to which the float 12 will sink. The float 13, however, together with the enlarged lower portion of the arm 14, as stated before, are similar to the bulb of a hydrometer. This float 13 will therefore sink below the level of the liquid until it reaches a point of equilibrium. Any change in the density of the liquid will cause the two floats to separate or to move toward one another, as the case may be.

As the level of the liquid rises or falls, both floats will rise or fall substantially the same distance. The upper end of the arm 14 will indicate on the scale on the arm 11 the temperature at which the mixture will freeze, for it will be observed that if there is a large proportion of alcohol present, the mixture will be less dense, the float 12 will sink farther, and the end of the arm will move downwardly, thus indicating a lower temperature at which the liquid will freeze. As heretofore stated, the arm 14 is adapted to move with respect to the scale on the arm 11. It is obvious that the more alcohol mixed with the water, the less the specific gravity of the fluid. The float 13 will therefore drop to a greater depth in the fluid. This will cause the pointer to move downwardly with respect to the scale and to thus indicate a greater percentage of alcohol with a lower freezing point. It is a well known fact that alcohol freezes at a lower temperature than water. From the foregoing structure it will be apparent that the device instantly shows the amount of alcohol in the fluid and the freezing point of the mixture.

In Figure 4 we have indicated a double scale, so that percentages, as for instance, of alcohol, may be instantly determined by simply observing the position of the end of the pointer or arm 14 on the scale on the arm 11.

In order to keep the scale on the arm 11 from rotating, we may arrange a guide strip, such as that shown in Figure 3. This consists merely of a plate 16 having an elongated slot 17 arranged to receive the arm 11, and being provided also with an opening 18 arranged to receive the arm 14. This plate may be secured within the bore of the cap by screws 19, or in any other suitable manner. This insures the positioning of the scale on the arm 11, so as to face in one direction.

It is obvious that changes may be made in the construction, without departing from the spirit of the invention in any way.

We claim:

1. In a liquid gauge, a float having an opening therein, an indicating arm extending upwardly from said float, said arm being provided with a scale, a second float having a portion arranged to extend through the opening in said first named float, an arm secured to the extending portion of said second named float and arranged in juxtaposition with respect to the scale on the arm connected to said first named float, a transparent tube for receiving said indicating arm and said scale, and a casing for holding said transparent tube, said casing having a glazed front, and the rear of the casing being provided with a scale extending in the longitudinal direction of the tube.

2. An indicating mechanism comprising an open ended tube, a cap secured to the upper end of the tube, a casing carried by the cap and having a glazed front, the rear of the interior wall of the casing being provided with a scale, an upper float disposed within the tube and being provided with an opening, a scale secured to said upper float and arranged to extend into the casing, a second float disposed below the upper float and having a portion arranged to extend through the opening in the upper float, and an indicating arm secured to the extension of the lower float and arranged to lie close to the scale on the upper float.

3. An indicating mechanism comprising an open ended tube, a cap secured to the upper end of the tube, a casing carried by the cap and having a glazed front, the rear of the interior wall of the casing being provided with a scale, an upper float disposed within the tube and being provided with an opening, a scale secured to said upper float and arranged to extend into the casing, a second float disposed below the upper float and having a portion arranged to extend through the opening in the upper float, an indicating arm secured to the extension of the lower float and arranged to lie close to the scale on the upper float, said cap being provided with threads for attaching the cap to the radiator filler spout, and means for preventing the rotation of the arm bearing the scale.

4. The combination with a radiator cap, a glass for said cap, said glass having a graduated scale thereon to indicate the amount of liquid in the radiator, a tube depending from the radiator cap a ring-shaped float disposed within said tube, a second float disposed below said ring-shaped float, a scale carried by said ring-shaped float and having graduations thereon indicating the freezing temperature of the liquid and the percentage of solution in the water, a pointer carried by said second named float and projecting through said ring-shaped float, said second named float being adapted to sink in the liquid to a predetermined depth dependent upon the density of the liquid, whereby the freezing temperature of the liquid, the amount of solution in the liquid, and the amount of liquid is indicated by the pointer.

5. The combination with a radiator cap having a glass casing with a scale thereon, said scale being adapted to indicate the amount of liquid in a radiator, a tube carried by said cap, a ring-shaped float disposed in said tube, and having a scale slidably disposed in said tube, said second named scale indicating the amount of solution in the liquid and the freezing temperature of the liquid, a second float disposed beneath said ring-shaped float and having a pointer slidably disposed in said ring-shaped float and in said tube, said second named float being adapted to sink in the liquid to a predetermined depth dependent upon the density of the liquid, whereby the freezing temperature, the percentage of solution in the liquid, and the amount of liquid in the radiator is indicated by the pointer.

6. The combination of a radiator cap having means for attachment to a radiator, a disc-shaped casing carried by said cap, a glass cover portion for said casing and having graduations thereon indicating the amount of fluid within the radiator, a tube carried by said cap and being adapted to extend into the liquid a glass tube disposed in said casing and a ring-shaped float slidably disposed in said first named tube, and having a scale slidably disposed in said glass tube, said scale being adapted to indicate the freezing temperature and the amount of solution in the liquid in the radiator, a second float slidably disposed in said first named tube, and having a pointer extending through said ring-shaped float and being slidably disposed in said glass tube, said second named float being adapted to sink in the liquid to a predetermined depth dependent upon the density of the liquid, whereby the freezing temperature, the amount of solution, and the amount of liquid in the radiator is indicated by said pointer.

JESSE C. GREENE.
LEWIS F. DAVIS.